(12) United States Patent
Brewington et al.

(10) Patent No.: US 8,130,249 B2
(45) Date of Patent: Mar. 6, 2012

(54) ERASE DECOUPLED FROM WRITING FOR ERASABLE PAPER

(75) Inventors: Grace T. Brewington, Fairport, NY (US); Anthony S. Condello, Webster, NY (US); Daniel Martin Bray, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 185 days.

(21) Appl. No.: 12/542,440

(22) Filed: Aug. 17, 2009

(65) Prior Publication Data

US 2011/0037821 A1 Feb. 17, 2011

(51) Int. Cl.
*B41J 2/32* (2006.01)
(52) U.S. Cl. .......................................... 347/171
(58) Field of Classification Search .................. 347/171, 347/223
See application file for complete search history.

(56) References Cited

U.S. PATENT DOCUMENTS

| | | | |
|---|---|---|---|
| 5,405,726 A * | 4/1995 | Abe et al. | 430/97 |
| 2007/0165094 A1 * | 7/2007 | Matsumura et al. | 347/223 |
| 2008/0191136 A1 | 8/2008 | Shrader et al. | |
| 2008/0310869 A1 | 12/2008 | Iftime et al. | |
| 2010/0225722 A1 * | 9/2010 | Elrod et al. | 347/104 |
| 2011/0012969 A1 * | 1/2011 | Brewington et al. | 347/101 |
| 2011/0037802 A1 * | 2/2011 | Brewington et al. | 347/16 |
| 2011/0037820 A1 * | 2/2011 | Brewington et al. | 347/179 |
| 2011/0057869 A1 * | 3/2011 | Shrader | 345/107 |

FOREIGN PATENT DOCUMENTS

| | | |
|---|---|---|
| EP | 0542192 | 5/1993 |
| EP | 2228221 | 9/2010 |
| EP | 2275874 | 1/2011 |
| JP | 2001334649 | 12/2001 |

* cited by examiner

*Primary Examiner* — Huan Tran
(74) *Attorney, Agent, or Firm* — MH2 Technology Law Group LLP

(57) ABSTRACT

An erasable media imaging device includes an input for supplying erasable media to the imaging device, the erasable media being one of an imaged erasable medium and a non-imaged erasable medium. An erase subsystem is provided for erasing an imaged erasable medium and a write subsystem is provided for imaging a non-imaged erasable medium, the erase subsystem and function decoupled from the write subsystem and function. In a corresponding method, one of an imaged erasable medium and a non-imaged erasable medium are supplied to the imaging device. The method further includes selecting only one of an erase mode and a write mode, the erase mode decoupled from the write mode, erasing an imaged erasable medium in the erase mode, and imaging the non-imaged erasable medium in the write mode.

13 Claims, 3 Drawing Sheets

ERASE DECOUPLED FROM WRITING FOR ERASABLE PAPER

DESCRIPTION OF THE INVENTION

1. Field of the Invention

This invention relates generally to imaging and, more particularly, to erasing and imaging erasable media in an imaging device.

2. Background of the Invention

Paper documents are often promptly discarded after being read. Although paper is relatively inexpensive, the quantity of discarded paper documents is enormous and the disposal of these discarded paper documents raises significant cost and environmental issues. It would, therefore, be desirable for paper documents to be reusable, to minimize both cost and environmental issues.

Erasable media is that which can be reused many times to transiently store images, the images being written on and erasable from the erasable media. For example, photochromic paper employs photochromic materials to provide an imageable surface. Typically, photochromic materials can undergo reversible or irreversible photoinduced color changes in the photochromic containing layer. In addition, the reversible photoinduced color changes enable imaging and erasure of photochromic paper in sequence on the same paper. For example, a light source of a certain wavelength can be used for imaging erasable media, while heat can be used for inducing erasure of imaged erasable media. An inkless erasable imaging formulation is the subject of U.S. patent application Ser. No. 12/206,136 filed Sep. 8, 2008 and titled "Inkless Reimageable Printing Paper and Method" which is commonly assigned with the present application to Xerox Corp., and is incorporated in its entirety herein by reference.

Because imaging of erasable media has unique requirements, it has previously required dedicated equipment. In particular, a UV source can be required to image the erasable media, and heat can be required to erase an imaged erasable media. In addition, specific temperature parameters are required for each of the imaging and erasing of erasable media. While traditional imaging devices are suitable for performing conventional imaging of non-erasable media, their architecture can be insufficient for handling erasable media alone or in combination with non-erasable media.

Thus, there is a need to overcome these and other problems of the prior art and to provide an imaging system in which imaged and non-imaged erasable paper can be selectively erased and imaged in a single pass through the imaging system. Even further, the imaging device should be capable of interchangeably sharing components and efficiently processing work.

SUMMARY OF THE INVENTION

According to various embodiments, the present teachings include an imaging device. The imaging device includes an input for supplying a medium to the imaging device, the medium including at least one of an imaged erasable medium and a non-imaged erasable medium. An erase subsystem includes active and inactive states, the erase subsystem erasing an imaged erasable medium in an active state. A write subsystem images a medium received therein.

According to various embodiments, the present teachings also include a method for decoupling erase and writing in a reusable paper imaging system. In this method, one of an imaged erasable medium and a non-imaged erasable medium are supplied to the imaging device. The method further includes selecting only one of an erase mode and a write mode, the erase mode decoupled from the write mode, erasing an imaged erasable medium in the erase mode, and imaging the non-imaged erasable medium in the write mode.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

It should be noted that some details of the figures have been simplified and are drawn to facilitate understanding of the inventive embodiments rather than to maintain strict structural accuracy, detail, and scale.

DESCRIPTION OF THE EMBODIMENTS

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

As used herein, the term "erasable media" refers to transient material that has the appearance and feel of traditional paper, including cardstock and other weights of paper. Erasable media can be selectively imaged and erased.

As used herein, imaged erasable media refers to erasable media having a visible image thereon, the image a result of, for example, ultraviolet (UV) imaging of the erasable media.

As used herein, non-imaged erasable media refers to erasable media which has not been previously imaged, or erasable media having an image erased therefrom and available for UV imaging. An exemplary erasable medium is described in connection with FIG. 1 below.

As used herein, the term "non-erasable" refers to traditional media of the type used in any conventional imaging such as ink jet, xerography, or liquid ink electrophotography, as known in the art. An example of a non-erasable traditional medium can be conventional paper.

Figure 1:
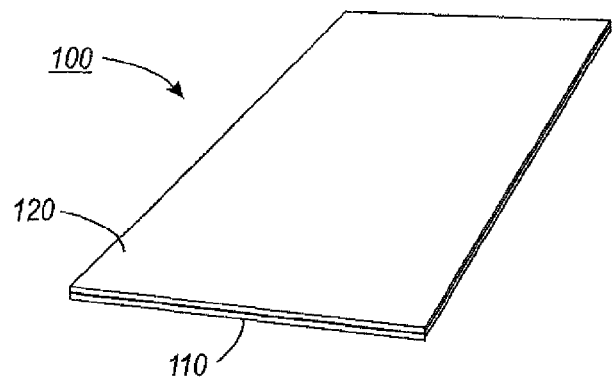
FIG. 1 is a perspective depiction of an erasable medium having a photochromic coating which allows for writing an image in the coating on the medium and for erasing an image from the coating.

FIG. 1 depicts an exemplary erasable medium 100 in accordance with the present teachings. It should be readily apparent to one of ordinary skill in the art that the erasable medium 100 depicted in FIG. 1 represents a generalized schematic illustration and that other layers can be added or existing layers can be removed or modified.

As shown in FIG. 1, the erasable medium 100 can include a substrate 110 and a photochromic material 120 incorporated into or on the substrate 110. The photochromic material 120 can provide a reversible writing (i.e. erasable) image-forming component on the substrate 110.

The substrate 110 can include, for example, any suitable material such as paper, wood, plastics, fabrics, textile products, polymeric films, inorganic substrates such as metals, and the like. The paper can include, for example, plain papers such as XEROX® 4024 papers, ruled notebook paper, bond paper, and silica coated papers such as Sharp Company silica coated paper, Jujo paper, and the like. The substrate 110, such as a sheet of paper, can have a blank appearance.

In various embodiments, the substrate 110 can be made of a flexible material and can be transparent or opaque. The substrate 110 can be a single layer or multi-layer where each layer is the same or different material and can have a thickness, for example, ranging from about 0.05 mm to about 5 mm.

The photochromic material 120 can be impregnated, embedded or coated to the substrate 110, for example, a porous substrate such as paper. In various embodiments, the photochromic material 120 can be applied uniformly to the substrate 110 and/or fused or otherwise permanently affixed thereto.

Portion(s) of photochromic material of an imaged erasable medium 100 can be erased. In order to produce the transition from a visible image to an erased medium, heat can be applied to the erasable medium 100 at a temperature suitable for effecting the erasure. For example, at a temperature between about 80° C. to about 200° C., the erasable medium 100 can be completely erased. In order to re-image the erased (or image an original) erasable medium 100, the erasable medium 100 can be heated to a temperature of between about 55° C. to about 80° C. before writing using, for example, UV exposure.

It will be appreciated that other types of erasable media, other than photochromic paper, can be used in connection with the exemplary embodiments herein. Such types of erasable media are intended to be included within the scope of the disclosure.

Figure 2:
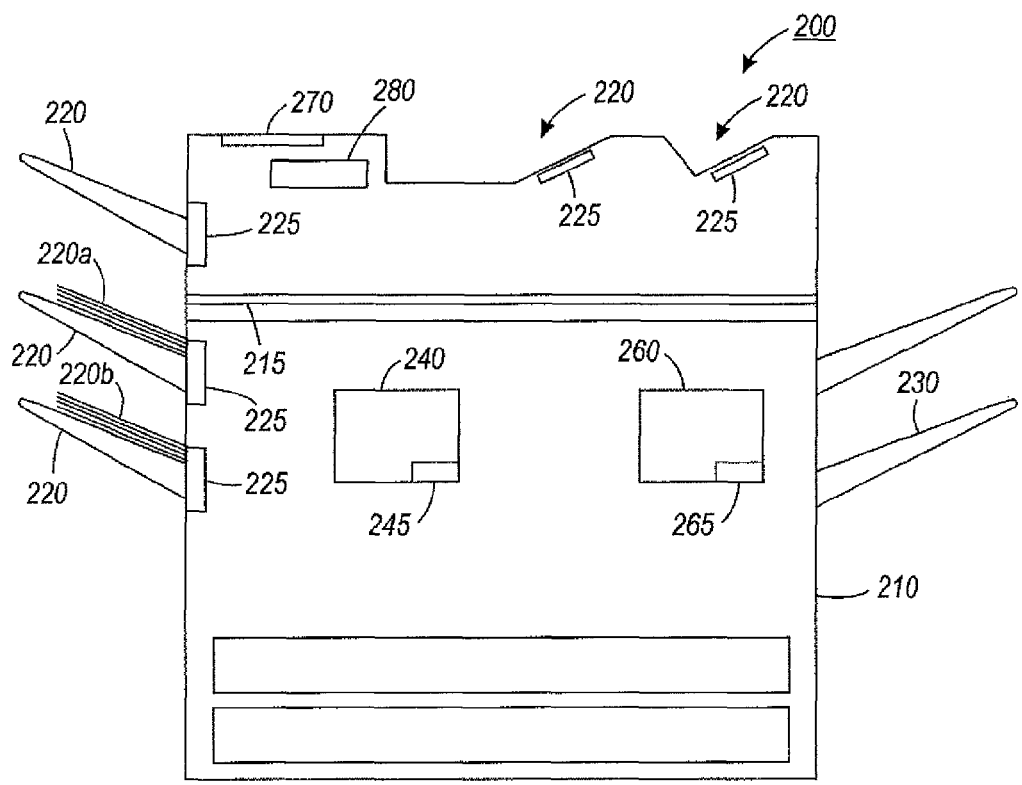
FIG. 2 depicts an imaging apparatus in accordance with the present teachings.

FIG. 2 depicts an exemplary imaging system 200 in accordance with the present teachings. It should be readily apparent to one of ordinary skill in the art that the imaging system 200 depicted in FIG. 2 represents a generalized schematic illustration and that other components can be added or existing components can be removed or modified.

As shown in FIG. 2, the imaging system 200 can include a housing 210 with erasable media input 220 and erasable media output 230 locations. In addition, the imaging system 200 can include a platen 215, an erase subsystem 240, a write subsystem 260, a user interface 270, and a control system 280.

The housing 210 can be of a material and size to accommodate the exemplary components of the imaging system 200. In certain embodiments, the housing 210 can include a desktop device. The housing 210 can further include a full size floor supported device. Sizes for each are known in the art and not intended to limit the scope of the invention.

The erasable media inputs 220 can include one or more input trays for each of an imaged erasable media 220a and a non-imaged erasable media 220b. Alternatively, a single input tray 220 can be utilized to support either an imaged erasable media supply or a non-imaged erasable media supply as will be described in the following. As used herein, a non-imaged erasable media can include those which have been previously erased yet not immediately imaged subsequent to erase.

The erasable media output 230 can include one or more output trays. The number and position of output trays 230 can correspond to a process or mode of the imaging device 200. By utilizing the output trays for specific receipt functions, an operator can easily determine a subsequent process for the erasable media.

In certain embodiments, the erasable media can include a photochromic reusable paper. The photochromic reusable paper can be imaged or non-imaged.

In certain embodiments, a sensor 225 can be provided to detect a type of erasable media entering the imaging device 200. The sensor 225 can be proximate each input tray 220, incorporated in the input tray 220, or interior of the housing 210. For example, the sensor 225 can detect an imaged erasable medium and, in combination with the control system 280, selectively direct that erasable medium in a single pass through the system in order to erase or image the erasable medium. By way of example, the sensor 225 can detect a non-imaged erasable medium and, in combination with the control system 280, direct that erasable medium in a single pass through the system in order to image the erasable medium. In the case of a photochromic reusable paper, the write subsystem 260 can be a UV imaging system.

The erase subsystem 240 can include hardware for erasing imaged erasable media, such as photochromic reusable paper. In certain embodiments, with respect to photochromic erasable paper, the erase subsystem 240 can include a heating mechanism or heater 245. In general, the erase subsystem 240 can operate to generate heat in a range of about 80° C. to about 200° C. The erase subsystem can further operate to generate heat in a range of about 90° C. to about 170° C. For example, at a temperature of about 160° C., the erase subsystem 240 can erase an imaged transient document. In certain embodiments, the erase subsystem 240 can include heat rolls, heating lamps, heating pads, and temperature and power controls.

In certain embodiments, the erase subsystem 240 can operate as a sheet heater for heating an erasable medium to a temperature suitable for UV imaging at the write subsystem 260. Subsequent to operation in an erase mode, the heater of the erase subsystem 240 can be cycled out and transitioned to a standby temperature. The standby temperature can be comparable or approximate the temperature needed to heat an erasable medium for UV imaging. The standby temperature can be less than a temperature required for UV imaging. Upon selection of a write mode, the heater of the erase subsystem 240 can, at its current standby temperature, or by elevating the standby temperature, attain a temperature capable of heating an erasable medium to a temperature suitable for UV imaging. An exemplary UV imaging temperature of a transient document can be in the range of about 55° C. to about 80° C. A further exemplary imaging temperature can be in the range of about 60° C. to about 70° C., and about 65° C. Other UV imaging temperatures can be set according to a type of erasable medium and such imaging temperatures are intended to be included within the scope of the invention.

In certain embodiments, the write subsystem 260 can include imaging components suitable for imaging erasable media. Imaging can include radiant energy at a wavelength in the 10 to about 450 nanometer range. Imaging can be UV imaging. The write subsystem 260 can image, and for example UV image, an erasable medium once the erasable medium reaches a temperature suitable for UV imaging. The temperature of the erasable medium can be established within the write subsystem 260 by a heater 265 incorporated therein. The heating mechanism 265 can heat the erasable medium to a temperature suitable for UV imaging within the write subsystem 260.

In certain embodiments, a user interface 270 can be provided with respect to the housing 210. The user interface 270 can work with control system 280 components, responsive to user input, for directing the functions of the imaging system 200. In certain embodiments, the imaging system 200 can be configured through the user interface 270 to start up in a selected mode. Certain modes of operation can include an erase mode and an imaging mode. The erase mode can initiate erase of an erasable medium. Alternatively, the user interface 270 can prompt the operator to check for the proper media at the job start and to select a mode based upon the type of job requirements. The user interface 270 can further be responsive to the sensor 225 and control system 280, and the sensor 225 and control system 280 can be responsive to input at the user interface 270.

Figure 3:
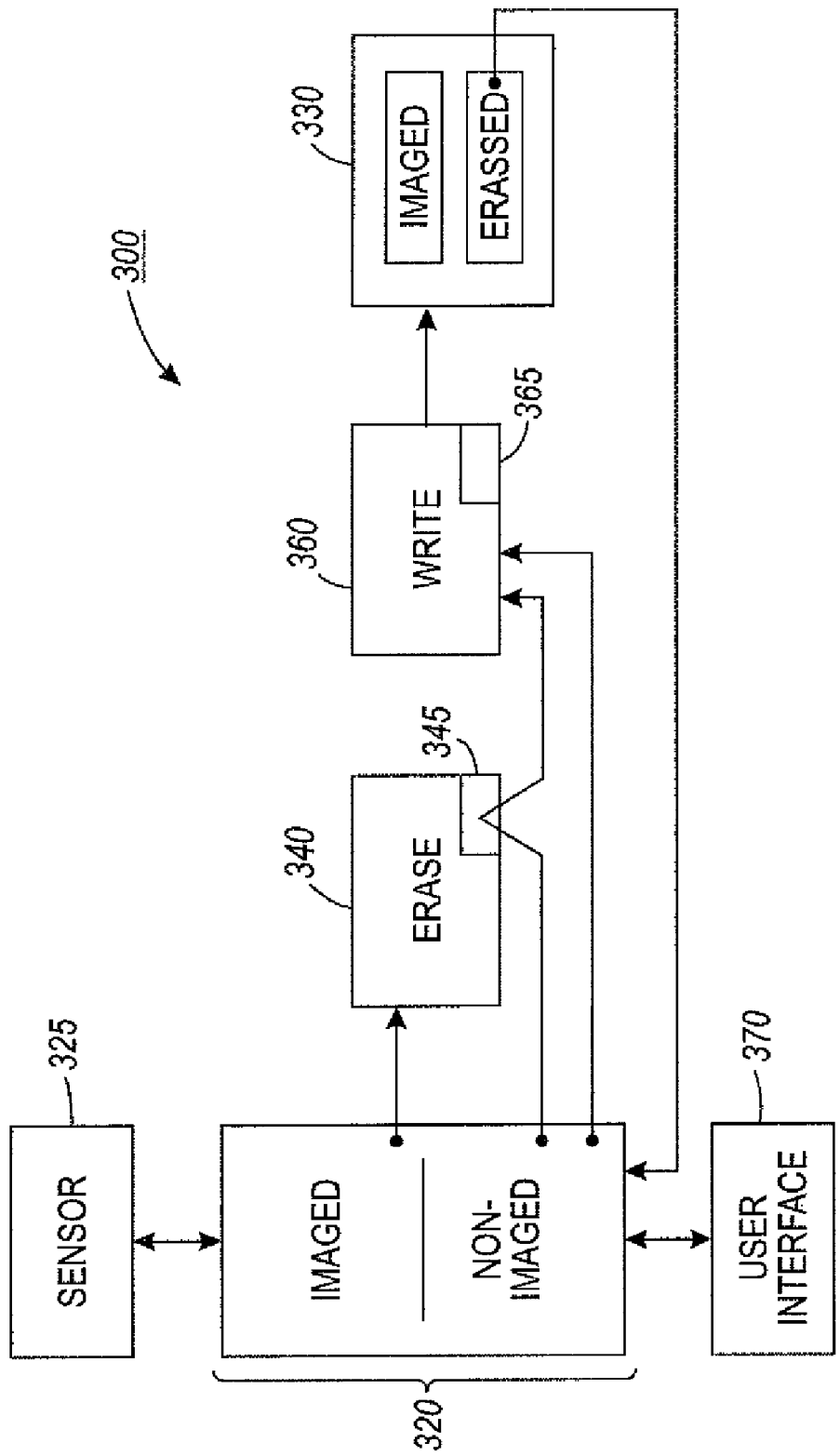
FIG. 3 is a schematic diagram depicting exemplary passages of an erasable medium within the imaging apparatus of FIG. 2 in accordance with the present teachings.

FIG. 3 is a schematic illustration depicting a system 300 of exemplary passages of erasable media in accordance with the present teachings. It should be readily apparent to one of ordinary skill in the art that the examples depicted in FIG. 3 represents a generalized schematic illustration and that other components can be added or existing components can be removed or modified.

In certain embodiments, the exemplary passages of FIG. 3 can require the use of an input 320, a sensor 325, an erase subsystem 340, a write subsystem 360, a user interface 370, and an output 330. As indicated above, the erase subsystem 340 can erase erasable media. Further, the write subsystem 360 can image via UV imaging of erasable media.

When an imaged erasable medium is detected or selected for imaging, the imaged erasable medium will first need to be erased before it can be imaged. In certain embodiments, the imaged erasable medium (whether sensed by sensor 325 or input at the user interface 370) can, in a single pass through the system, travel through the erase subsystem 340 followed directly by discharge from the system 300, for example at the output 330. At the erase subsystem 340, the imaged erasable medium can be heated to a temperature suitable for erasing any image on the erasable medium. In certain embodiments, the erase can be repeated. Further, the imaged erasable medium can reside in the erase subsystem 340 for a time corresponding to the suitable temperature to achieve an erasure. The erase subsystem 340 can be of a length or passage sufficient to house the imaged erasable medium for a duration which will enable erasure at a predetermined erase temperature.

Subsequent to erasure and discharge from the system 300, the erased erasable medium can be returned to an input tray 320 for imaging with the write subsystem 360. For the case where the operator moves the erased erasable medium to the feed tray 320, a single feed tray is enabled for the system 300. A single feed tray system can have significant advantages in hardware reduction compared to a system utilizing two feed trays 320. It will be appreciated that while multiple feed trays are depicted in the figures, the disclosure is intended to include those embodiments utilizing only a single feed tray.

At the write subsystem 360, a received erasable medium can be UV imaged. Because the erase mode has been decoupled from the write mode, a need for cooling sheet subsequent to erasure has been eliminated. A configuration whereby a cooling system is absent can significantly reduce hardware and energy requirements of a system. It will be appreciated that the write subsystem 360 can include a heating mechanism for elevating or maintaining the temperature of the cooled erasable medium to the temperature suitable for UV imaging. A sheet heater 365, incorporated into the write subsystem 360, can heat an erasable medium to a temperature suitable for UV imaging of that erasable medium.

When a non-imaged erasable medium is either selected or detected, the non-imaged erasable medium can, in a single pass through the system 300, be fed directly to the write subsystem 360. In certain embodiments, when a non-imaged erasable medium is detected to be a photochromic reusable paper, the write subsystem 360 can heat the erasable medium to a temperature suitable for UV imaging. In certain embodiments, when a non-imaged erasable medium is detected, the erasable medium can travel through the erase subsystem 340 with the heater 345 of the erase subsystem 340 set to a temperature capable of heating the erasable medium to temperature suitable for UV imaging. Subsequent to imaging at the write subsystem 360, the imaged erasable medium can be expelled from the system 300, for example by automatic stacking on output tray 330.

In certain embodiments, the user interface 370 can be used to select an erase only mode or a write only mode. Job selection can be executed at the user's personal computer print dialog box through the properties link to the print driver controls. In an erase only mode, an imaged erasable medium (either selected from a feed tray or detected by a sensor) can be erased at the erase subsystem 340 in a single pass through the system 300 for discharge to an output 330. In a write mode, a non-imaged erasable medium (either selected from a feed tray or detected by sensor 325) can be imaged at the write subsystem 360 in a single pass through the system 300 for discharge to an output 330. In a write mode, the non-imaged erasable medium (either selected from a feed tray or detected by sensor) can, in a single pass through the system, be heated to a UV write temperature by the heater of the erase subsystem 340 and imaged a the write subsystem 360, and discharged from the system 300.

As used herein, decoupling erase jobs from write jobs for erasable media can enable reduction in hardware. For example, the same erasable media heater 345 can be used at an erase temperature (e.g. 160° C.) for erase jobs and at an imaging temperature (e.g. 65° C.) for UV imaging write jobs. Further, decoupling erasable medium erase jobs from writing jobs enables using a different (e.g. slower) process speed for erase jobs as compared to write jobs. This can enable lower temperature operations, longer life of parts due to the lower temperature operations, and reduced heat emissions to the office environment.

Figure 4:
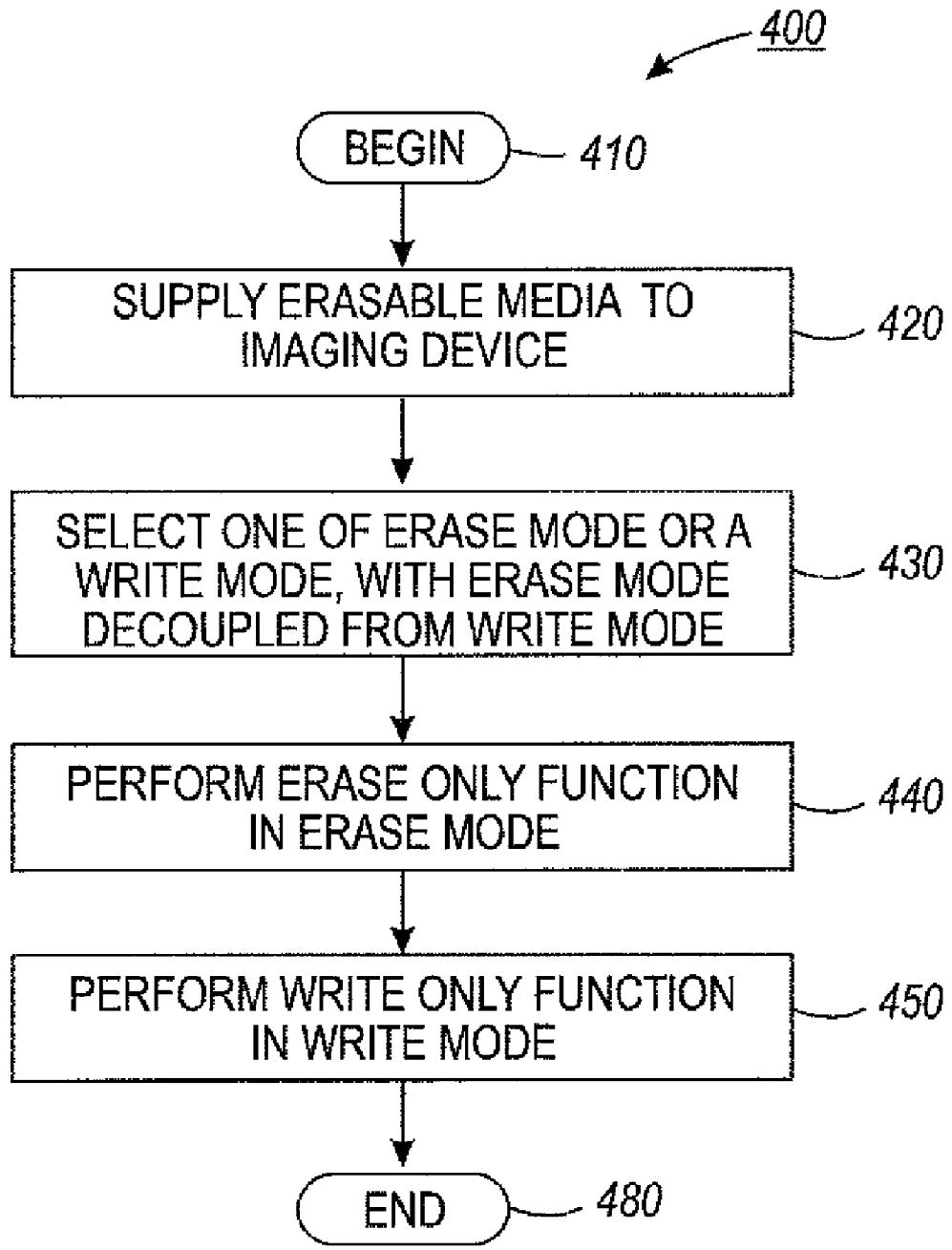
FIG. 4 depicts an exemplary method for utilizing the imaging apparatus in accordance with the present teachings.

FIG. 4 discloses a method 400 for imaging in accordance with the present teachings. It should be readily apparent to one of ordinary skill in the art that the method 400 represents a generalized schematic illustration and that other components can be added or existing components can be removed or modified.

The method can begin at 410.

At 420, an erasable medium is supplied to a reusable paper imaging device. The erasable medium can include one of an imaged erasable medium and a non-imaged erasable medium. The non-imaged erasable medium can be in the original, or previously erased in an erase mode described below. The erasable medium can be a photochromic reusable paper.

At 430, one of an erase mode or a write mode is selected, the erase mode decoupled from the write mode. Selection of an erase mode or a write mode can be at a user interface of the device. The user interface can function to configure the imaging device for either the erase mode or the write mode. Selection of the erase mode or write mode can be automatic based on a sensing of a type of erasable medium at an input to the device.

Selection of the erase mode performs an erase only function at 440 on an imaged erasable medium. Likewise, selection of the write mode performs a write only function at 450 on a non-imaged erasable medium. In other words, a detected or selected non-imaged erasable medium bypasses the erase subsystem in the write mode. Further, a detected or selected imaged erasable medium bypasses the write subsystem in the erase mode. In each instance, an erasable medium only takes a single pass through the entire system.

At 460, the method can end, but the method can return to any point and repeat prior to ending at 460.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g. −1, −1.2, −1.89, −2, −2.5, −3, −10, −20, −30, etc.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An erasable media imaging device comprising:
    an input for supplying erasable media to the imaging device, the erasable media comprising at least one of an imaged and a non-imaged erasable medium;
    a sensor for detecting a type of erasable media input into the imaging device;
    an erase subsystem for erasing an imaged erasable medium; and
    a write subsystem for imaging a non-imaged erasable medium, the erasing decoupled from the imaging of erasable media.

2. The device of claim 1, further comprising a user interface for configuring the imaging device.

3. The device of claim 2, wherein the user interface is configured to allow selection of one of a write only mode and an erase only mode.

4. The device of claim 1, wherein the sensor is positioned in advance of the erase subsystem and the write subsystem.

5. The device of claim 1, wherein 1, wherein a write only mode at the write subsystem is active for a detected non-imaged erasable medium independent of operation of the erase subsystem.

6. The device of claim 1, wherein a write only mode comprises the erase subsystem heating a detected non-imaged erasable medium to an imaging temperature.

7. The device of claim 1, wherein the input comprises at least one feed tray and the sensor.

8. The device of claim 1, wherein the erasable medium comprises photochromic paper.

9. The device of claim 8, wherein the erase subsystem comprises a heater component at an erase temperature of the photochromic paper.

10. A method of erasing and writing in an imaging device, the method comprising:
    supplying erasable media to an imaging device, the erasable media comprising one of an imaged erasable medium and a non-imaged erasable medium;
    automatically detecting a type of erasable media input into the imaging device;
    selecting only one of an erase mode and a write mode, the erase mode decoupled from the write mode;
    erasing an imaged erasable medium in the erase mode; and
    imaging the non-imaged erasable medium in the write mode.

11. The method of claim 10, further comprising configuring the imaging device via a user interface.

12. The method of claim 10, wherein a detected non-imaged erasable medium bypasses the erase subsystem in the write mode.

13. The method of claim 10, wherein a detected imaged erasable medium bypasses the write subsystem in the erase mode.

* * * * *